UNITED STATES PATENT OFFICE.

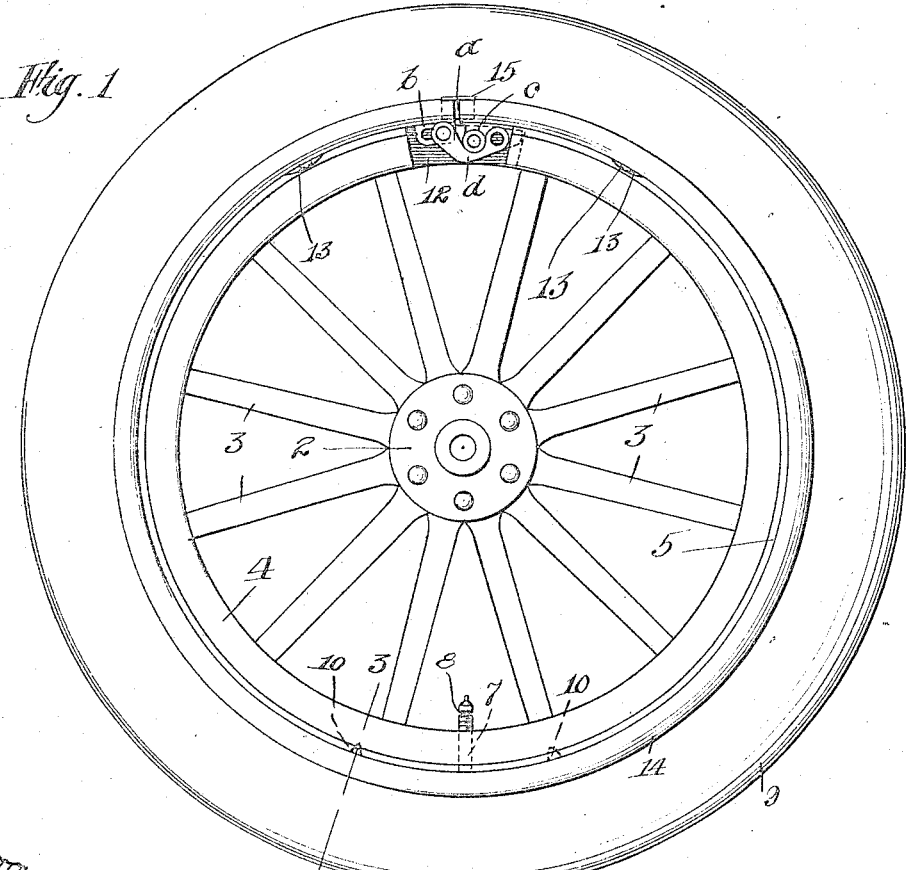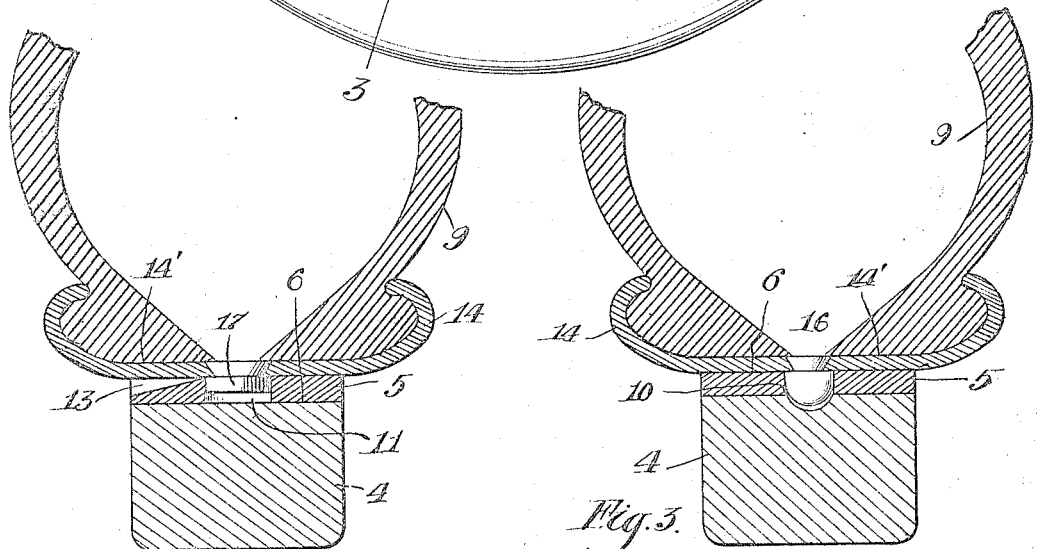

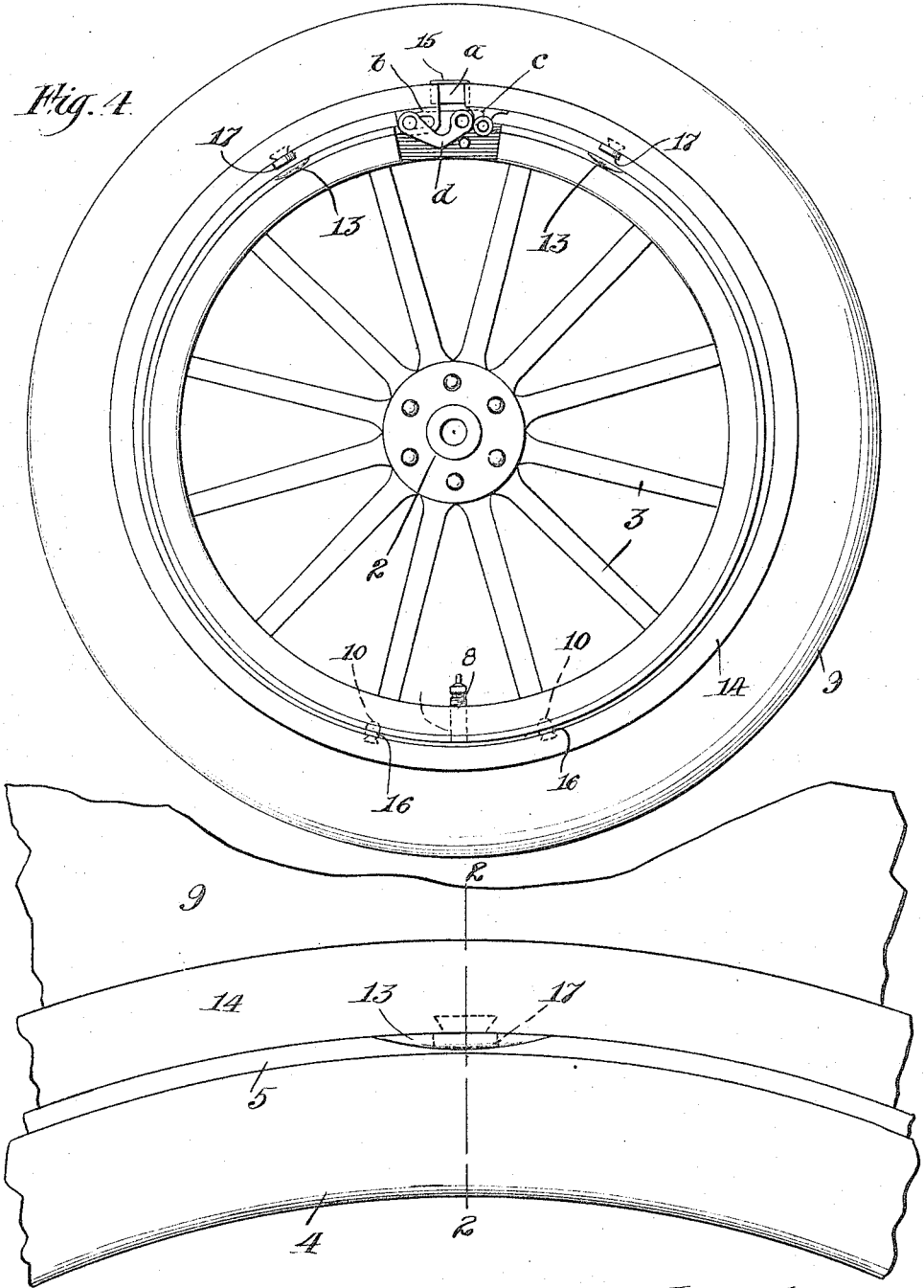

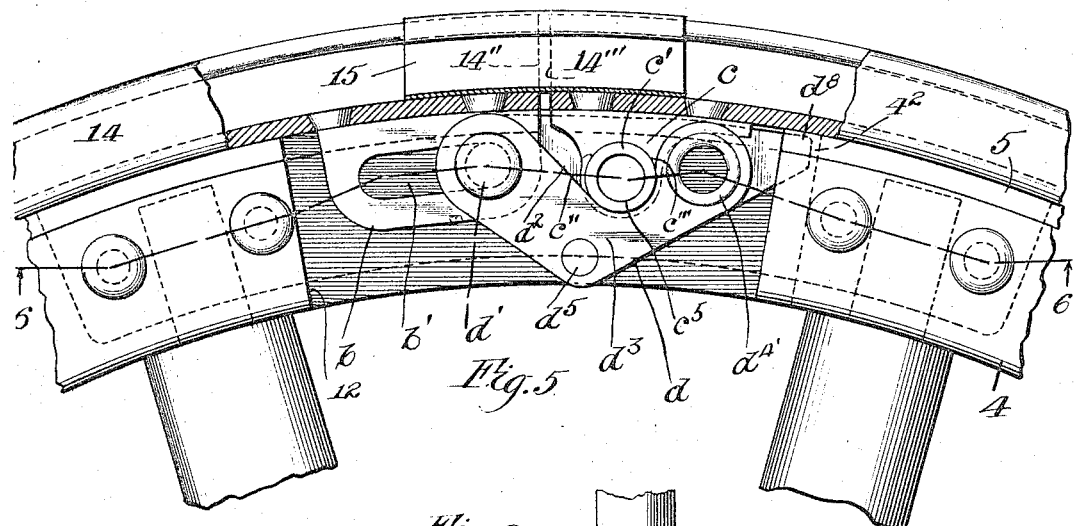
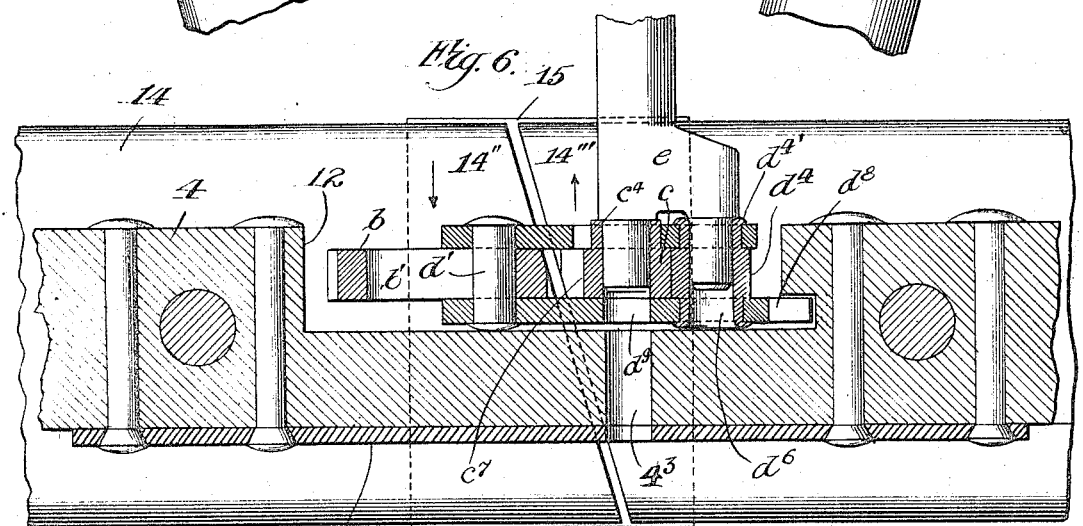
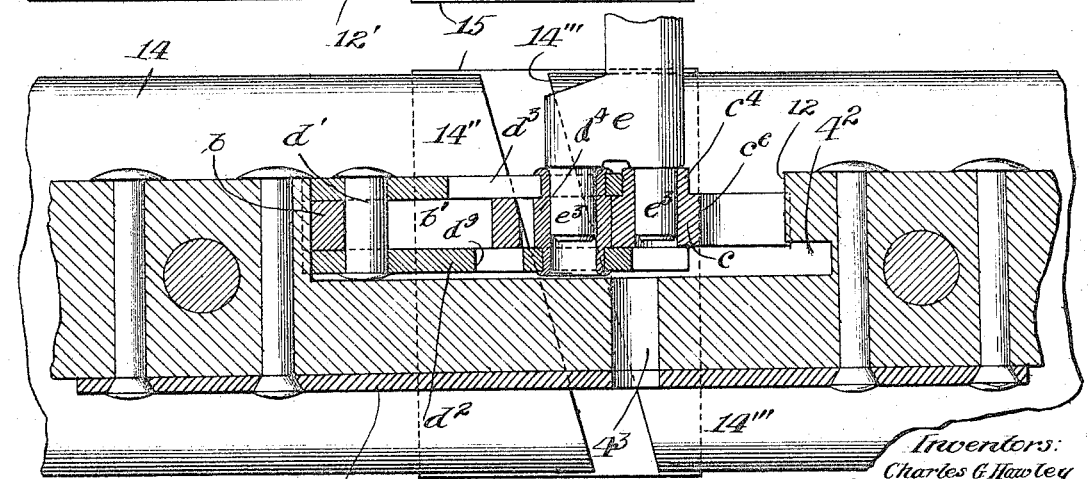

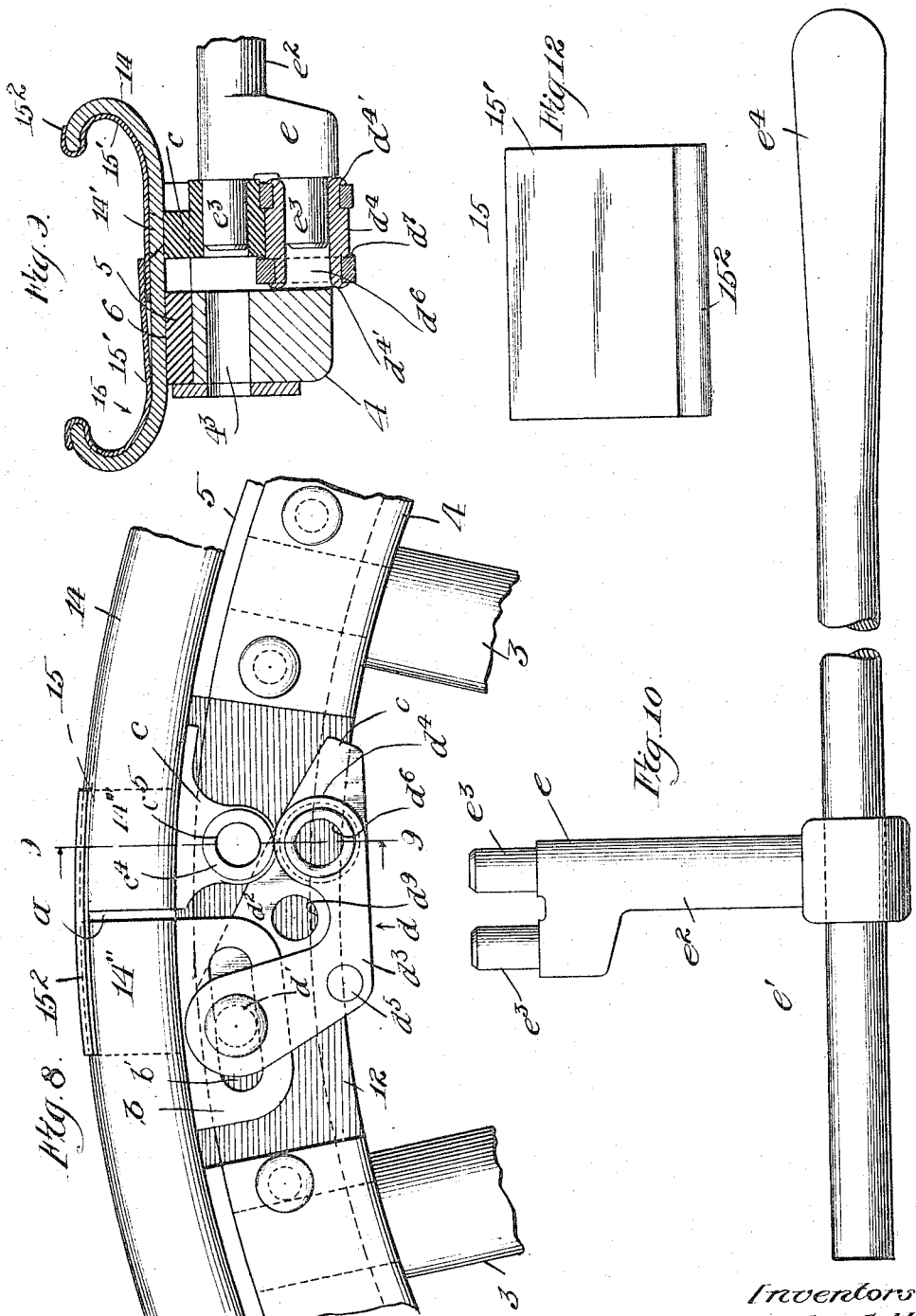

CHARLES GILBERT HAWLEY AND ERLE K. BAKER, OF CHICAGO, ILLINOIS, ASSIGNORS TO UNIVERSAL RIM COMPANY, OF CHICAGO, ILLINOIS, A CORPORATION OF ILLINOIS.

PNEUMATIC-TIRE MOUNTING.

1,155,417. Specification of Letters Patent. Patented Oct. 5, 1915.

Continuation of application Serial No. 502,069, filed June 14, 1909. This application filed December 14, 1910. Serial No. 597,263.

*To all whom it may concern:*

Be it known that we, CHARLES GILBERT HAWLEY and ERLE KING BAKER, citizens of the United States, and residents of Chicago, Cook county, Illinois, have invented certain new and useful Improvements in Pneumatic-Tire Mountings, of which the following is a full, clear, and exact description, such as will enable others skilled in the art to make and use the same.

Our invention relates to improved means for mounting or securing tires upon wheels of automobiles and the like, and has special reference to improvements in so-called demountable or removable rims of the class adapted to carry inflated tires and to be quickly mounted upon and demounted from wheels.

This application is a continuation of our copending application Serial No. 502,069, filed June 14, 1909, which originally disclosed and described much of the subject matter of this application.

The object of our invention is to provide a structure that will enable the quick placing of a pre-inflated tire or a deflated tire upon an automobile wheel; which will insure the retention thereof on the wheel; and which will enable the quick and easy exchange of an old or deflated tire for an inflated tire.

Another object of the invention is to provide a rim of such construction that the expansive force of an inflated tire thereon shall serve to clamp and effectively hold the rim on the wheel.

Another object of the invention is to so improve the construction of expansible rims that only slight expansion and contraction shall be required to mount and demount the rim, thereby especially adapting such a rim for easy use with so-called quick detachable or non-expansible bead tires.

A further object of the invention is to provide a demountable rim and complementary wheel which may be put together and taken apart by the manipulation of a single operating mechanism; and further to provide an operating mechanism which shall have but two, definite movements; as contrasted with screw devices, which are indefinite or variable, as to movement.

A further object of the invention is to provide a demountable rim and complementary wheel which may be assembled and dismembered without detaching parts thereof, *i. e.* to provide a device which shall be free from "loose parts", by which is meant parts that need be removed and replaced and which would be likely to be lost.

Still further objects of the invention will appear hereinafter.

Our invention consists in various novel constructions and combinations of parts, all as hereinafter described and particularly pointed out in the appended claims; which will be readily understood by reference to the accompanying drawings, forming part of this specification and in which:

Figure 1 is a side view of an automobile wheel constructed in accordance with, and provided with a demountable rim embodying, our invention. Fig. 2 is a cross-section on the line 2—2 of Fig. 1, and Fig. 11; Fig. 3 is a cross section on the line 3—3 of Fig. 1; Fig. 4 shows the rim expanded and ready to be entirely removed from the wheel; Fig. 5 is an enlarged side view of the rim locking and operating mechanism, taken from Fig. 1; Fig. 6 is a sectional view on the line 6—6 of Fig. 5, the operating wrench being shown in position; Fig. 7 is a sectional view similar to Fig. 6 but showing the operating mechanism in unlocked condition; Fig. 8 is a view similar to Fig. 5, but showing the operating mechanism in unlocked condition; Fig. 9 is a sectional view on the line 9—9 of Fig. 8, showing the operating tool in position; Fig. 10 illustrates our novel operating tool or wrench; Fig. 11 is an enlarged detail side view of the parts of the wheel and rim which contain interlocking parts; Fig. 12 is a top plan view of one of the bridge plates shown in Figs. 8 and 9.

The device herein shown is known as a demountable rim. In one sense, it constitutes in itself, a complete inflated tire carrier; in another sense our rim is incomplete without the wheel upon which it is adapted to be mounted and from which it may be easily detached with the tire which it carries. In like sense, the wheel is incomplete without the rim, the latter being the medium through which the wheel is equipped with its pneumatic tire.

Our invention is characterized by a rim made in the form of a split ring, that is, it is open, split or cut transversely at one point. By expanding this rim it is so enlarged that it may be easily placed upon or taken from the periphery of the wheel and certain features of our invention relate to the means employed for forcibly expanding and contracting the rim, and for detachably fastening it upon the wheel. The invention may partake of various forms, but we prefer the structure herein shown as it comprises the smallest number of parts capable of performing all the necessary and desirable functions required of a demountable rim. As hereinafter described the rim, taken by itself, comprises the tire holder or rim proper and the several parts which it carries; and the wheel will be described as made up of the hub, spokes, felly and felly tire. It will at once be understood that although our invention is usually applied to wooden wheels, it is also adapted for use with metallic wheels.

Referring now to the drawings, 2, represents the wheel hub; 3, the spokes; 4 the felly; and, 5, the fixed metal tire. The felly and tire are shown in cross section in Figs. 2 and 3 from which it will be seen that the tire is a metal band, that it is substantially rectangular in cross section, the same providing the wheel with a flat or cylindrical periphery, 6. The demountable rim when in use, is firmly seated on this periphery, as hereinafter described. At one point the felly and fixed tire contain a hole, 7, to receive the valve stem, 8, of the pneumatic tire, 9. At points adjacent to the valve stem opening the wheel periphery is provided with two holes, 10, 10, to receive the hereinafter described lugs, or studs, which project from the inner periphery of the rim. At other points, the wheel periphery contains slots, 11, to receive other studs on the rim. The holes, 10 and 11, are formed in the metal tire, 5, as shown. At a point diametrically opposite the valve stem hole, 7, the wheel felly and tire contain a wide notch, or recess, 12 (see Figs. 1, 5, 6 and 7) to accommodate the rim operating mechanism, or device. A plate 12' is securely riveted to the rear face of the felly 4, spanning the gap 12 therein and serving to strengthen this weakened portion of the felly. It will be noted that there are no projections upon the periphery of the wheel. The edge of the metal tire 5, is beveled at points adjacent to the slots, 11, (see Fig. 2) to facilitate the entrance of the interlocking lugs of the rim.

Our rim, 14, as here shown is of ordinary flanged, clencher form in cross section, having a main or middle portion, 14', that is flat or cylindrical, and hence adapted to seat firmly on the cylindrical fixed tire periphery as shown in Figs. 2, 3 and 9. The exact shape of the flanges of the rim is not material, for our invention admits of the use of rims of various cross sections, having flanges of various kinds and forms, suited to different tires and different uses to which they are to be put. The rim is split or cut transversely at one point (a) and may therefore be opened and closed after the manner of a split ring. We do not use a straight cut across the rim, but make the cut or split at an inclination to the edges thereof, preferably as shown in Figs. 6 and 7. This is done to facilitate the passing of one end of the rim by the other end at times when the rim is to be contracted for insertion, in or removal from the base beads of a tire; obviously the ends, 14'', and 14''', may be readily passed or laterally contorted in the directions of the arrows in Fig. 6. Such movement facilitates the manual contraction of the rim and the placing of a tire thereon, also the removal of the rim from a tire.

The opening or gap between the ends of the rim is normally closed by a bridge, 15, which is formed out of sheet metal and conforms to the shape of the inner surface of the rim. This bridge is not pinned or attached to the rim and may be pushed back on one end of the rim when the tire and the rim are being put together or taken apart, this operation necessarily preceding the lateral separation of the rim ends. When both ends of the rim have been properly placed on the base of the tire and before the tire is fully inflated, the bridge is shifted into the other end of the rim to properly bridge the gap. The inclined ends of the rim make it easy to shift the bridge. The bridge completely closes the gap in the rim and prevents the rubber tire or its inner tube from sinking into the gap. It does not interfere with the expansion and contraction of the rim and at all times substantially retains its mid-relation to the two ends of the rim, it is most effective when the gap, $a$, is widened by the expansion of the rim, as shown in Figs. 4 and 7. An important feature of our bridge member lies in the construction which permits its collapse transversely of the rim to render it readily and easily movable therein. As best disclosed in Figs. 8 and 9 it consists of two identical plates 15' each of which closely conforms to the inner surfaces of the flange of the rim and is curved to conform to the peripheral curve of the rim, the inner ends of the plates overlapping at the middle or flat portion 14' of the rim.

The outer ends $15^2$ of the bridge plates 15' extend out around the edges or lips of the flange of the rim and are formed to lie closely upon the outer surface thereof thus offering substantially no projection to catch dirt or mud. Slight lateral pressure upon the bridge members will move them toward each other and permit their free or easy transfer along the rim into or out of position bridging the gap, and should they, for any cause, become cemented or stuck in place, the individual pieces can be readily pried loose, preparatory to the longitudinal movement of the bridge in the rim.

The valve stem opening, 7, in the rim is placed directly opposite the split, $a$, and the valve stem of the tire projects through said opening, as shown in Figs. 1 and 4.

The lugs, 16, 16, are riveted or otherwise secured to the inner periphery of the rim on opposite sides of the valve stem opening, $14^a$, and are spaced to enter the holes, 10, in the wheel felly. Said lugs, or studs, 16, have pointed or rounded ends to facilitate entrance to the holes, 10. They serve several purposes. They facilitate the placing of the rim on the wheel, by guiding it to its proper seat, and preventing the rim from twisting on the wheel, virtually performing the function of a temporary hinge between the wheel and the rim. The lugs also take the strain off the valve stem by holding the rim against rotation on the wheel. They also hold the rim against lateral movement on the wheel; and finally, they perform the important function of holding the valve stem side of the rim against movement on the wheel while the rim is being expanded and contracted thereon. These lugs, 16, enter the holes in the wheel at the time that the valve stem is entered and before the split side of the rim is pushed on to the wheel. This being the case they do not take up room between the rim and the wheel during either assembly or separation, and no more expansion of the rim is required to get it on and off the wheel than would be the case if the lugs, or studs, 16, were not used.

The lugs, or studs, 17, 17, as shown in Figs. 1, 4, and 11, are attached to the inner periphery of the rim, and are adapted to enter the slots, 11, in the wheel periphery. They therefore serve to interlock the wheel and the rim against lateral movement when and as long as the rim is contracted on the wheel. These lugs are preferably riveted in the rim, and are preferably equi-distant from one another and the valve stem. If desired such lugs or headed rivets may be arranged in groups of two or three, at these points, but we have found one lug at each point to be sufficient. The lugs, 17, are of such length that they clear the periphery of the wheel, when the rim is slightly expanded. As before stated the grooves, notches, or bevels, 13, in the wheel facilitate the placing of the rim on the wheel; by preventing the lugs from catching on the edge of the fixed metal tire 5.

Our novel operating and locking device or mechanism herein referred to comprises four principal parts or members, to-wit: the lug, $b$, the lug, $c$, the hook-link, $d$, and the wrench, or tool, $e$. The lug, $b$, is attached to the end, 14″, of the rim and the lug, $c$, is attached to the other end, 14‴, thereof. The link serves as an operative connection between the lugs, $b$ and $c$. The wrench, $e$, is an entirely separate part which is applied to the other members only when the rim is to be expanded or contracted. At such times the wrench serves as a temporary link, or crank, between the lug, $c$, and the free end of the hook-link, $d$, as shown in Figs. 6, 7 and 9. The operating mechanism and the rim have but two conditions in normal use, $i.\ e.$ the rim is either fully locked in open or expanded condition, or is fully locked in contracted condition. There are no intermediate positions, or conditions, of partial contraction or expansion to confuse the user of the actuating wrench. In addition to the above indicated functions, the operating device when in locked condition on the wheel interlocks therewith and serves to fasten the ends of the rim against lateral movement on the wheel. An important feature of our locking device lies in the construction which permits the rim to automatically clamp and contract on the wheel after it has been manually contracted and locked thereto by the wrench operation. The locking device by connecting the two ends of the rim and securing the rim in contracted condition on the wheel enables the lateral interlocking parts (lugs 16 and 17) to perform their functions, and the rim cannot get off the wheel while thus held; at the same time the operating mechanism allows the ends of the rim to move more closely together, and thus permits the automatic taking up of wear between the rim and wheel and makes the expansive force of a tire, inflated on the rim, an effective element in the clamping of the rim on the wheel. Our split rim does not possess sufficient strength to withstand the pressure of an inflated tire and when the lock is removed from between the ends of the rim, as at times when the operating mechanism is in closed condition (see Figs. 1 and 5), such pressure closes the rim tightly about the wheel, clamping the rim thereon with an aggregate force amounting to several tons. It will now be clear that the inflated tire, on the rim, is chiefly relied on to fasten it to the wheel and that the operating mechanism is an auxiliary, for convenience and safety. Without it, there might be danger of losing the rim from the wheel when the tire is deflated.

As shown in Figs. 6 and 7 we prefer to place the operating mechanism close to the middle line of the rim with a view to avoiding distortion of the rim. The lug, $b$, is considerably longer than the lug, $c$, and contains a slot, $b'$, in which the pivot, $d'$, of the hook-link is slidable. The lost motion thus provided between the link, representing one end of the rim and the lug, $b$, on the other end, accomplishes two purposes; first, it takes up part of the motion of the hook-link so that the opening and closing movements of the rim are shorter than would otherwise be the case, and second, the slot and pin connection allows the rim to automatically contract on the wheel under pressure of the inflated tire, as before explained. The length of the slot is determined by the throw of the link, only part of which is utilized on the rim. The lug, $c$, has a round, or semi-cylindrical, end, $c'$, which co-acts with the end of the hook-link, and provides depressions, $c''$ and $c'''$ to retain the end of the link after it is once placed, or set, therein. A boss, $c^4$, is provided on the side of the lug, $c$, to bring the end of the lug out flush with the side of the link, for the better operation of the wrench. The lug, $c$, contains the hole, $c^5$, which is concentric with the semi-cylindrical end of the lug. Both lugs, as clearly shown in Fig. 5, are provided with integral riveting studs secured in respective parts of the rim and in addition the lugs, $b$ and $c$, are usually welded or brazed to the ends of the rim.

The hook-link, $d$, is composed of the substantial triangular inner section, $d^2$, the hook-like outer section, $d^3$, the pivot pin, $d'$, the cylindrical cross piece, $d^4$, and the cross pin, $d^5$. The parts, $d'$, $d^4$, and $d^5$, are preferably shouldered rivets which firmly fasten together the side pieces, $d^2$, and $d^3$. As shown in Fig. 9 the part, $d^4$, is hollow, containing the hole, $d^6$. The ends, $d^{4'}$, of the part, $d^4$, are spun, pressed or peaned upon the side parts of the link. This formation of the free end of the link virtually provides a groove, $d^7$, which interlocks with the edges, $c^6$, of the lug $c$; the boss, $c^4$, being of less diameter than the end of the lug $c$ to allow this. The semi-cylindrical formations of the lug, $c$, and of the free end of the link, allow the latter to rotate about the lug, $c$, as required to transfer the link from one side thereof to the other.

The member, $d^2$, is longer than the hook part, $d^3$, and forms a projection or nose $d^8$ which extends beyond the end part, $d^4$. The felly is provided with a notch or recess, $4^2$, which receives this projecting end, $d^8$, of the hook-link when the latter is in its locked position; whereby the locking device and hence the ends of the rim, are laterally interlocked with the wheel felly. Preferably, the notch, $4^2$, extends through the metal band, or metal tire, 5, so that the nose, $d^8$, contacts the metal tire (see Fig. 5).

The part, $d^2$, contains a hole, $d^9$, that alines with the hole. $c^5$, in the lug, $c$, when the parts are in locked condition. A prolongation, $4^3$, of this hole is provided in the wheel felly and at times we place therein a bolt or cross pin which serves to fasten the hook-link to the lug, $c$. This, however, is a precaution seldom observed except where the automobile is to be subjected to very rough usage.

Our wrench or operating tool, $e$, comprises the long handle, $e'$, the right-angled shank, $e^2$, and two studs or fingers, $e^3$. These studs are spaced to correspond with the spacing of the holes, $c^5$ and $d^6$, in the lug, $c$ and link $d$. The studs of the wrench may therefore be placed in these parts in whatever position the same are found, and by turning or rotating the wrench by means of the handle it will operate as a crank between lug, $c$, and the link, $d$, and cause an exchange of the positions thereof. Such exchange, or shifting of the operating device is clearly depicted in Figs. 1 and 4; Fig. 1 showing the parts in contracted condition, and Fig. 4, depicting them in expanded condition. It will be obvious that the wrench affords means for exerting great leverage on the locking parts, which leverage is rendered most advantageous by the toggle lever like action of the device. The first part of the movement of the wrench in either direction serves to unlock the end of the link from the lug. The next part of the movement of the wrench is taken up in the sliding of the link in the slotted lug, $b$, and the final part of the wrench movement exerts the actual effective opening or closing force upon the rim.

It will be noticed that the end, $e^4$, of the wrench handle is flattened so that it resembles a long screw-driver, or pry-bar, and this is the only tool that we use in manipulating the ends of the rim to place them in and take them out of tires.

To place our rim in a tire (this of course is done when both the rim and tire are off the wheel) the operator first pushes the bridge pieces, 15, back into one end of the rim, then opens the link and allows it to remain open, and then grasping either the link or the lug, $c$, draws one end past the other, whereupon the ends will lap slightly. He thereupon places one end and side of the rim on the beads of the tire, and then using the long handle of the wrench as a pry-bar quickly works the other side and end of the rim into place, finally forcing that end into alinement with the other end of the rim. Having accomplished this the operator pushes the bridge back across the gap and then by means of the wrench expands the rim. This being done the tire is ready to be inflated, and after being inflated the rim and tire are ready to be placed on the wheel. It is the practice to carry the inflated tire on the automobile in this way until it is needed. To exchange tires the operator, finding the rim on the wheel in locked condition, as shown in Fig. 1, applies the wrench and expands the rim. The tire being deflated at such time does not greatly oppose the expansion of the rim. The expansion of the rim lifts the lugs, 17, away from the wheel, and then the side of the rim which carries the locking device may be pulled off the wheel, following which the rim and tire may easily be lifted from the wheel, the valve stem withdrawing from the hole in the latter. The wheel, having been stripped, is ready to receive the inflated tire, and the operator drops the ready expanded rim onto the wheel, placing the valve stem therein and then pushing the other side of the wheel into place. Then the operator, by a half turn of the wrench, contracts the rim and through the medium of the hook-link firmly locks the same in contracted condition, and also interlocks it laterally with the wheel. Then for safety the operator can place a bolt in the lug, c, to fasten the hook-link and thus prevent it from becoming unfastened, should the rim be contracted sufficiently to permit this.

As various modifications of our invention will readily suggest themselves to one skilled in the art we do not confine the invention to the specific structure herein shown and described.

Having thus described our invention, we claim as new and desire to secure by Letters Patent:—

1. The improvement herein described, comprising a wheel in combination with a flanged tire-holding-rim fitting said wheel and split or open at one point for expansion and contraction thereon, of a link pivoted to one end of the rim, a lug on the other end of the rim, said lug and the end of said link being formed to interlock to hold the rim either open or closed, the free end of the link being formed to interlock with the wheel when the rim is in locked condition and prevent relative lateral displacement of the rim on the wheel.

2. The improvement described, comprising a wheel in combination with a flanged tire-holding rim fitting said wheel and split or open at one point for expansion and contraction thereon, of a rim contracting and expanding mechanism comprising a link pivoted on one end of the rim, a lug or part on the other end of the rim, said lug and the end of said link being formed to interlock in two positions to hold the rim either open or closed, said wheel being provided with a notch to receive said mechanism, and a groove in one wall of said notch adapted to receive the free end of said link when in closed position and prevent lateral movement of said link.

3. A demountable flanged tire-holding-rim in the form of a split ring and a complementary wheel having a felly and a metal felly band fixed thereon, in combination with rim expanding and contracting mechanism attached to the ends of the ring, said felly and band being notched to receive said mechanism, said mechanism comprising a link pivoted on one end of the said ring, a lug on the other end of the ring, said lug and the end of the link being formed to interlock in two positions to hold the rim either open or closed, said felly and fixed band being provided with registering slots in one end of said notch and said link having a longitudinal projection adapted to enter said slots when the link is moved to its closed position.

4. A demountable flanged tire-holding-rim in the form of a split ring and a complementary wheel having a felly and a metal felly band thereon, in combination with rim expanding and contracting mechanism attached to the ends of the rim, said felly and band being notched to receive said mechanism, said mechanism comprising a link pivoted on one end of said ring, a lug on the other end of the ring, said lug and the free end of the link being formed to interlock in two positions to hold the rim either open or closed, said felly and felly band being provided with registering slots in one end of said notch, and a projecting part on the free end of said link being formed to enter the slot in the felly and project into the slot in the felly band when the link is moved to its closed position.

5. A demountable rim in the form of a split ring, in combination with a two part bridge, bridging the gap or split in the rim, said bridge being transversely and circumferentially conformed to the inner surface of the rim and the two parts being movable toward each other within the rim.

6. A demountable tire holding rim in the form of a split ring, and a complementary wheel, in combination with a locking device joining the ends of the rim and comprising a link pivoted to one end of the rim, a lug on the other end of the rim, the lug and the free end of the link being formed to interlock in two positions to retain the rim either closed or open, the link and lug being capable of separation and the split in the rim being on a diagonal line whereby the two ends of the rim can be easily separated laterally to facilitate the placement and removal of a tire, and a projection on the free end of the link adapted to engage the wheel felly when the rim is contracted thereon and to prevent the relative lateral movement of the wheel and rim at this point.

7. A flanged tire-holding rim in the form of a split ring, adapted for expansion and contraction, in combination with a link pivotally and slidably connected to one end of the rim, the other end of the rim and the free end of the link being formed for co-action to expand and contract the rim, substantially as described.

8. A transversely split rim, in combination with a link slidably pivoted on one end of the rim, and having a boss or hook on its free end, a lug on the other end of the rim adapted to co-act with the free end of the link to secure the rim in contracted and expanded conditions under the action of a temporary link forming wrench adapted to engage said lug and the free end of the link, as and for the purpose specified.

9. In a tire holding device the combination with a flanged tire-holding rim in the form of a split ring having a lug on each end thereof adjacent the opening therein, a link pivotally connected to one of said lugs and rotatable into wedging and locking engagement with the other of said lugs.

10. In a tire holding device the combination with a flanged tire-holding rim in the form of a split ring having a lug on each end thereof adjacent the opening therein, a link pivotally and slidably connected to one of said lugs and rotatable into wedging and locking engagement with the other of said lugs, for drawing the ends of said ring together.

11. In a tire retaining device the combination with a flanged tire-holding rim in the form of a split ring conformed to the curvature of a wheel felly, a lug on one end of said ring and a locking part on the other end, both adjacent the opening therein, a link pivoted by one end to said lug, the other end of said link being rotatable through and past a line drawn through its pivotal center and the effective center of the locking part to contract said ring.

12. An expansible and contractible tire carrying rim in the form of a split ring, an inwardly projecting lug on each end thereof adjacent the opening therein, a link having at one of its ends a pivotal and slot connection with one of said lugs, the other end of said link having curved locking portions and being rotatable into locking engagement with said other lug.

13. An expansible and contractible tire-carrying rim in the form of a split ring, an inwardly projecting lug on each end thereof adjacent the opening therein, a link having at one of its ends a pivotal and slot connection with one of said lugs, the other end of said link having curved locking portions and being rotatable into locking engagement in two positions with said other lug.

14. The combination with a wheel and a split tire engaging ring concentrically mounted with respect to the wheel felly, a lug on one end of said ring adjacent the opening therein, and a locking part on the other end thereof adjacent the opening therein, said locking part having a curved locking surface, a link pivoted by one of its ends to said lug, the other end of said link being rotatable into locking engagement with said locking surface and adapted to draw the ends of said ring together thereby contracting said ring upon the wheel felly.

15. A wheel, in combination with a pneumatic tire-holding flanged rim, in the form of a split ring, interlocking means adapted to prevent relative rotation and lateral movement of the wheel and rim, device for holding the rim in expanded condition for removal from or placement upon said wheel, said device serving to retain the rim in interlocked condition with and upon the wheel but permitting the constant contraction of the rim on the wheel while in use or motion, substantially as described.

16. A wheel, in combination with a tire-holding, flanged rim, in the form of a split ring, demountably interlocked with and upon the periphery of said wheel, said wheel and rim having valve stem holes, the valve stem hole in the rim being diametrically opposite the split therein, rim expanding and contracting device connecting the ends of the rim and said device being formed to permit the independent contraction of the rim on the wheel by the pounding to which it is subjected in use, substantially as described.

17. The improvement herein described comprising a wheel, in combination with a pneumatic tire-holding flanged rim in the form of a split ring demountably interlocked with and upon said wheel, link mechanism for wedging apart the ends of the rim to adapt the rim for placement on or removal from the wheel, said mechanism being also adapted to exert wedging force for the contraction of the rim on the wheel, but being incapable of preventing the independent contraction of the rim on the wheel.

18. A wheel, in combination with a tire-holding, flanged rim in the form of an expansible and contractible split ring demountably interlocked upon and with the periphery of the said wheel, rim expanding and contracting device connecting the ends of the rim and adapted to hold the same interlocked with said wheel, said device and rim being formed to permit the continuous clamping or contraction of the rim on the wheel by a pneumatic tire, substantially as described.

19. A wheel and metal felly band thereon, in combination with a split rim formed to peripherally interlock with said felly band, a link pivoted on one end of the rim, a lug on the other end of the rim, said lug and the end of said link being adapted to interlock in two positions to hold the rim either open or closed, said lugs and link having registering openings to receive a locking bolt, substantially as described.

20. In a tire retaining device the combination with a tire holding rim in the form of a split contractible and expansible ring, of a lug on one end of said ring and a link pivotally connected thereto, a lug on the other end of said ring, said link being rotatable about its pivot into and out of locking engagement with the second mentioned lug, and means preventing relative lateral movement of the free end of the link and said second mentioned lug during the rotative movement.

21. In a tire retaining device, the combination with a tire-holding rim in the form of a split contractible and expansible ring, of a lug on one end of said ring and a link pivotally connected thereto, a lug on the other end of said ring, said link being rotatable about its pivot into and out of locking engagement with the second mentioned lug, the free end of the link and said second mentioned lug being relatively formed to interlock and prevent relative lateral movement.

22. In a tire retaining device, the combination with a flanged tire-holding rim in the form of a split ring conforming to the curvature of a wheel felly, a lug on one end of said ring and a locking part on the other end, both adjacent the opening therein, a link pivoted by one end to said lug, the other end of said link being rotatable into locking engagement with said locking part, a projecting flange on the free end of said link, and a complementary groove on said locking part receiving said flange and preventing lateral movement of these two members.

23. A wheel and a metal felly band thereon, in combination with a split ring formed to peripherally interlock with said felly band, a link pivoted on one end of the ring, a lug on the other end of the ring, said ring and the end of said link being adapted to interlock in two positions to hold the ring either open or closed, said lug and link having registering openings to receive a locking bolt, substantially as described.

24. In a tire retaining device, the combination with a tire-holding rim in the form of a split expansible and contractible ring, of a lug on one end of said ring and a link pivotally connected thereto, a lug on the other end of said ring, said link being rotatable on its pivot into and out of engagement with the second mentioned lug, the other end of the link and said second mentioned lug being relatively formed to interlock and prevent relative lateral movement, substantially as described.

25. In a tire retaining device, the combination with a flanged tire-holding rim in the form of a split ring conformed to the curvature of a wheel felly, a lug on one end of said ring, and a locking part on the other end, both adjacent the opening therein, a link pivoted by one end to said lug, the other end of said link being rotatable around said locking part into locking engagement therewith in two positions, a projecting flange on the free end of said link, and a complementary groove on said locking part receiving said flange and preventing the relative lateral movement of these two members during the rotative movement, substantially as described.

In testimony whereof, we have hereunto set our hands this 10th day of December, 1910, in the presence of two subscribing witnesses.

CHARLES GILBERT HAWLEY.
ERLE K. BAKER.

Witnesses:
  EDWARD F. WILSON,
  JOHN R. LEFEVRE.